Figure 8:
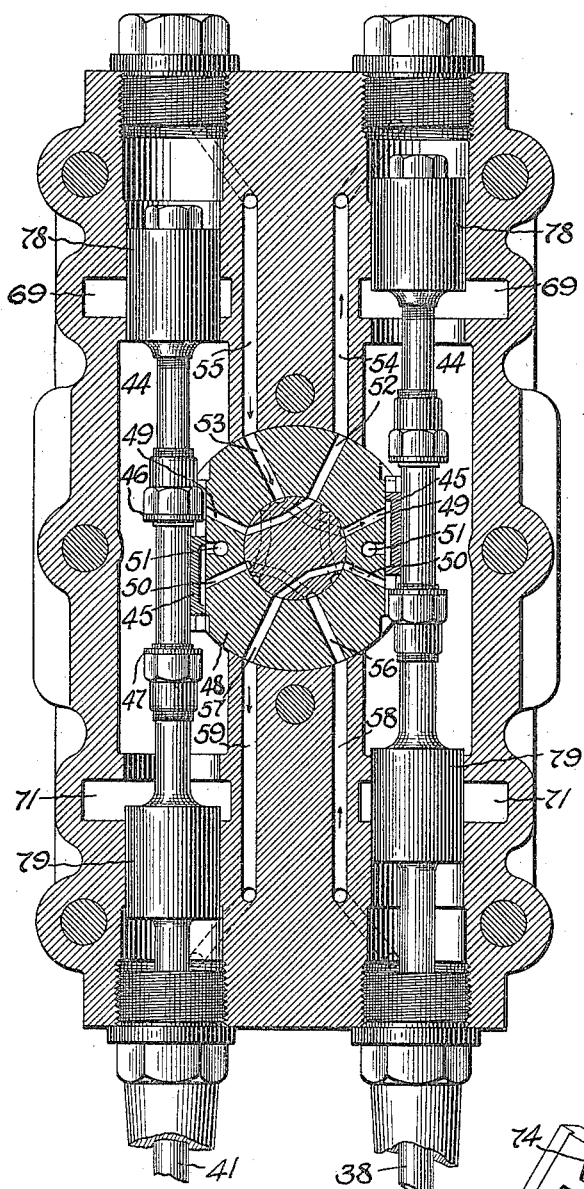

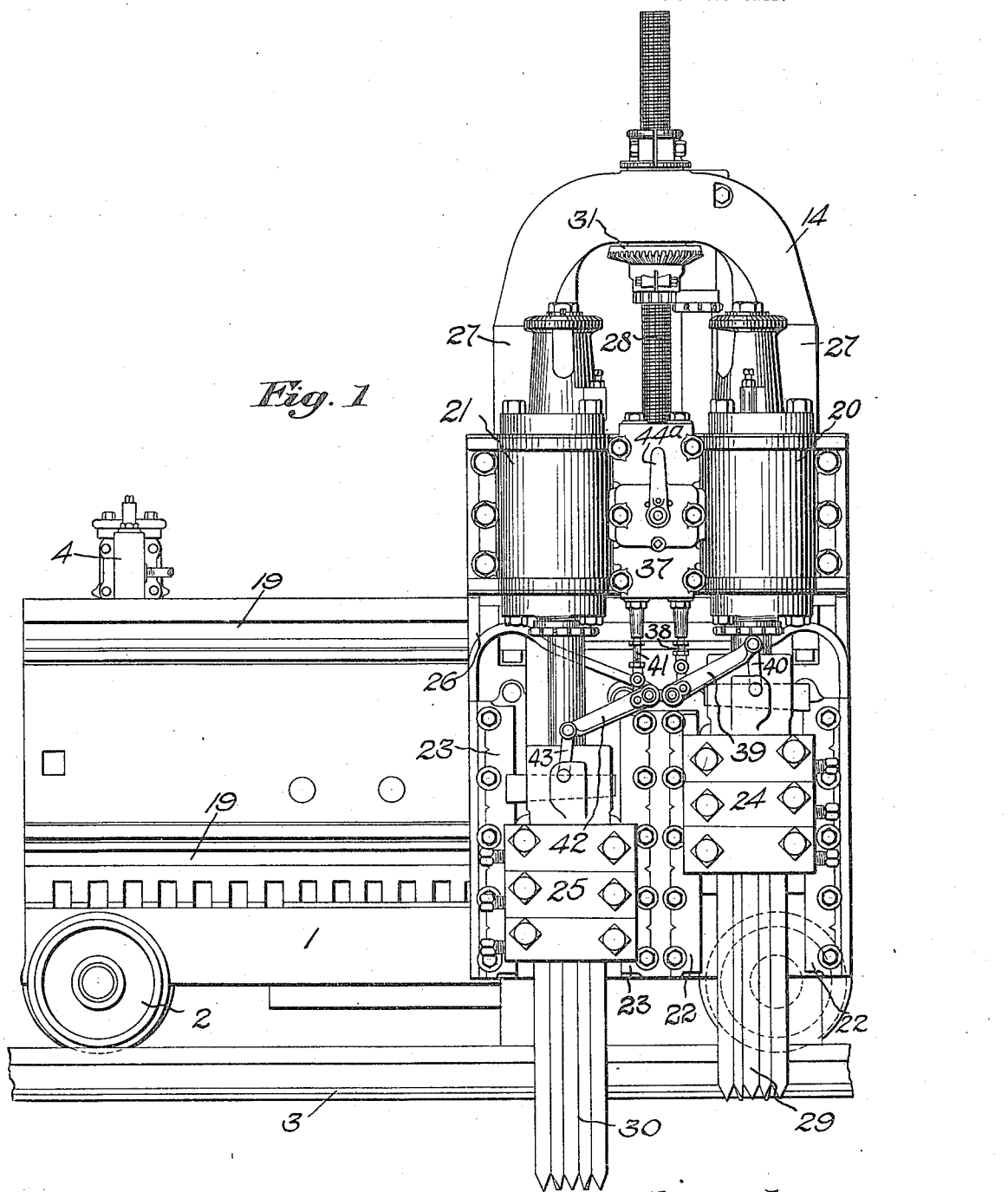

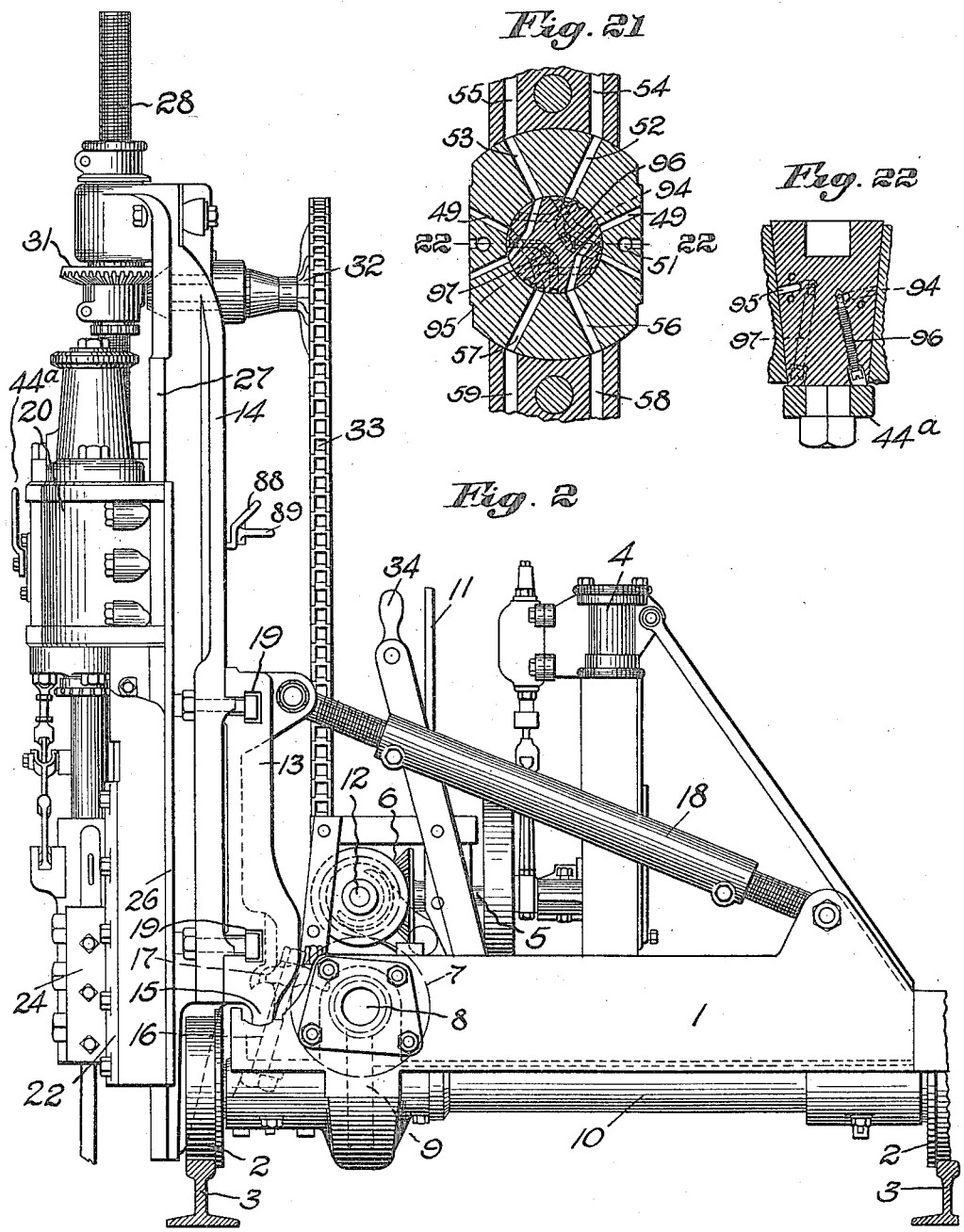

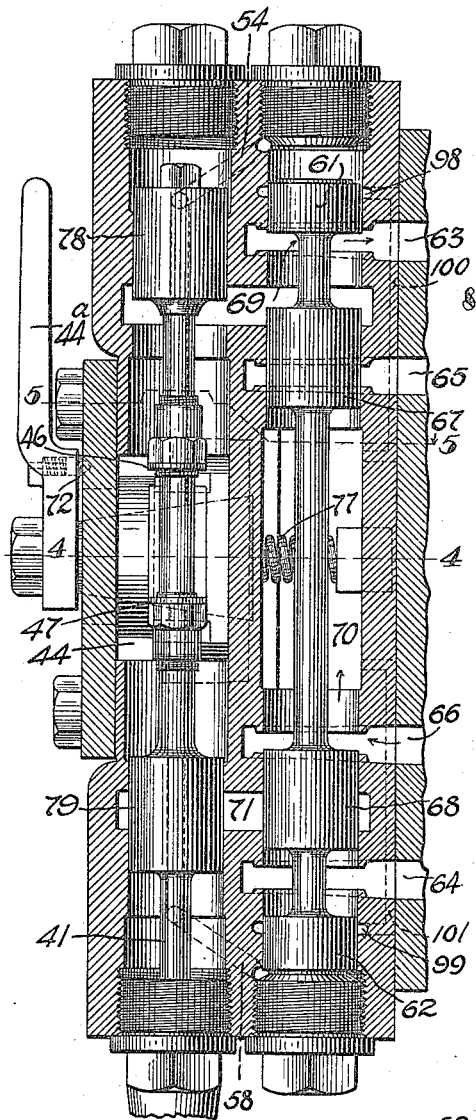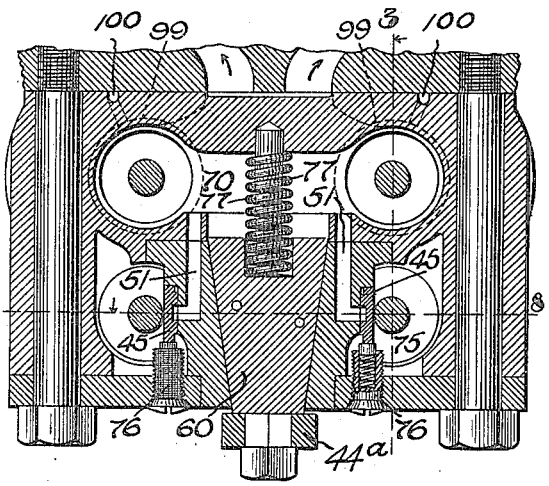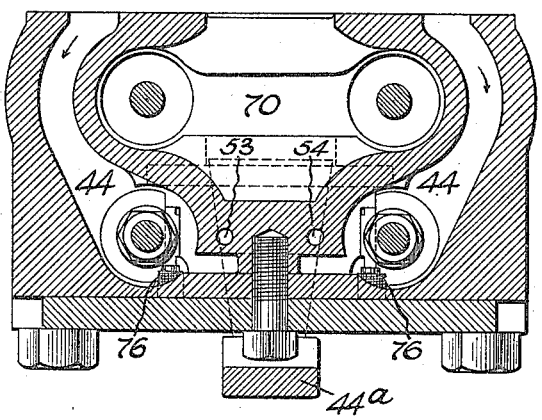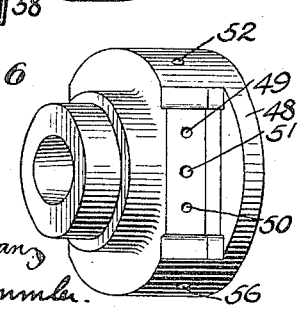

H. H. MERCER.
CHANNELING MACHINE.
APPLICATION FILED AUG. 22, 1907.

1,188,141.

Patented June 20, 1916.
6 SHEETS—SHEET 4.

Witnesses:
Horace H. Croisman
Robert H. Kammler

Inventor:
Henry H. Mercer
by Emery Booth
Attys

H. H. MERCER.
CHANNELING MACHINE.
APPLICATION FILED AUG. 22, 1907.

1,188,141.

Patented June 20, 1916.
6 SHEETS—SHEET 5.

Witnesses:
Horace H. Crossman
Robert H. Kammler

Inventor:
Henry H. Mercer
by Emery Booth
Attys.

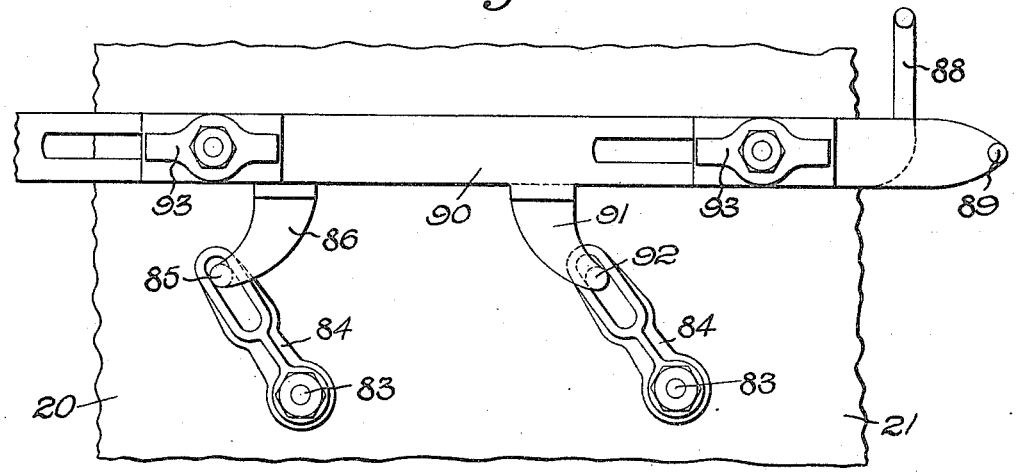
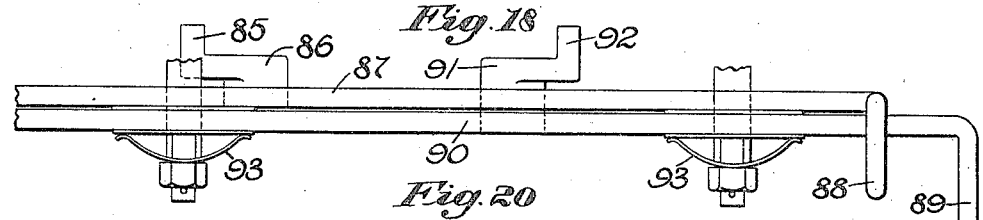
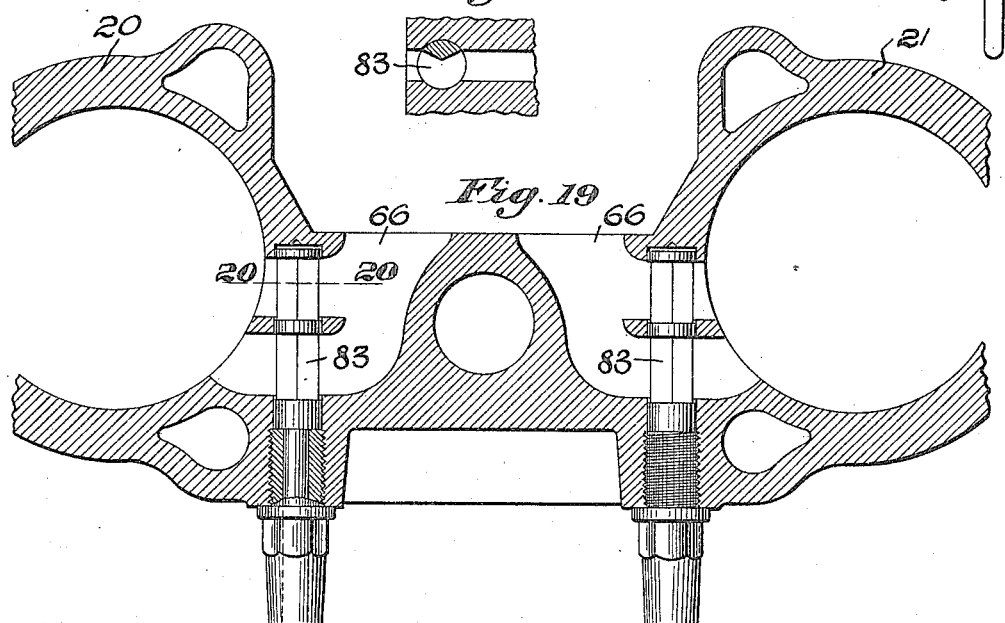

UNITED STATES PATENT OFFICE.

HENRY H. MERCER, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

CHANNELING-MACHINE.

1,188,141.  Specification of Letters Patent.  Patented June 20, 1916.

Application filed August 22, 1907. Serial No. 389,599.

*To all whom it may concern:*

Be it known that I, HENRY H. MERCER, a resident of Claremont, in the county of Sullivan and State of New Hampshire, have invented an Improvement in Channeling-Machines, of which the following description, in connection with the accompanying drawings, is a specification, like characters on the drawings representing like parts.

My invention relates to stone-working machines, and more particularly, though not exclusively, to channeling machines or the like.

My invention, as herein illustrated, is shown embodied in a track channeling machine employing two channeling units each with an independent gang of channeling tools arranged closely adjacent side by side at the edge of the truck, so that the channeler may be employed to cut a groove through the simultaneous action of two separate tool gangs, thereby greatly increasing the working capacity of the machine. In the machine constructed as disclosed, while the two gangs of tools are arranged closely adjacent each other, they are necessarily separated by a slight distance. As the machine is traversed to one end of the cut there will, therefore, be left a short portion of the cut over which one gang only has passed. To cut this portion down to its proper level it is necessary to traverse the machine back and forth once or twice, a distance equal to or possibly a little greater than the distance between the centers of the gangs. While this operation is taking place and the forward gang cutting, the remaining gang should not strike the rock. It therefore becomes desirable at times to operate both gangs simultaneously, and at other times to operate one or the other alone, while the remaining one is idle or inoperative.

One object of this invention is to provide such a system of control for a channeler of this type that this may be attained efficiently and economically, such control in the illustrated embodiment of my invention being comprehended in a novel arrangement of valves, which, in themselves and apart from their application herein, have features of general advantage, novelty and application.

My invention will be best understood by reference to the following description when taken in connection with the accompanying illustration of one specific embodiment thereof, while its scope will be more particularly pointed out in the appended claims.

Figure 9:
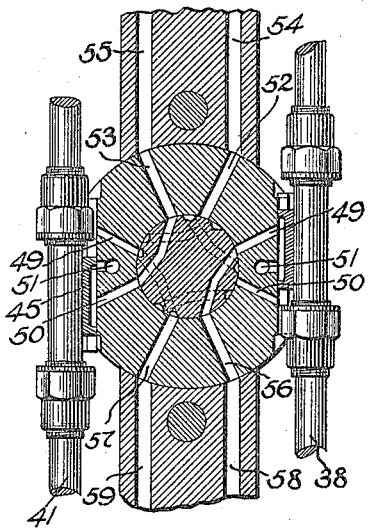
Figure 10:
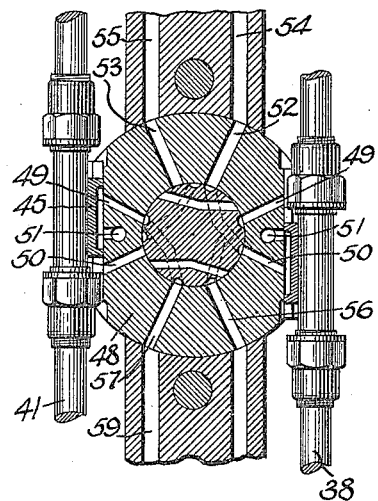
Figure 11:
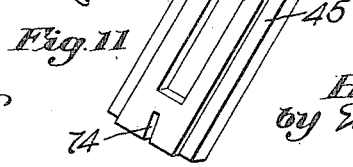
Figure 12:
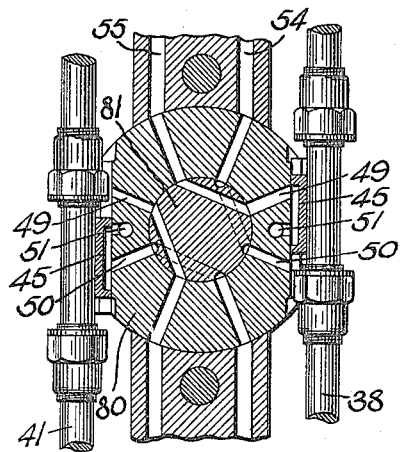
Figure 13:
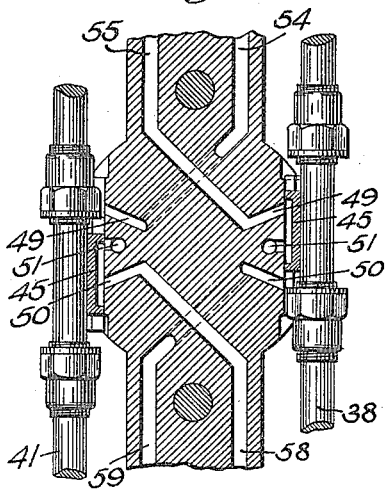
Figure 14:
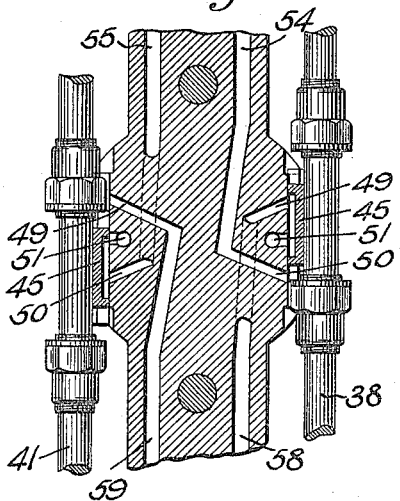
Figure 15:
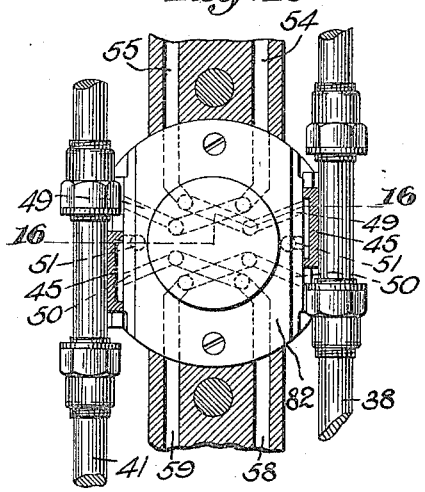
Figure 16:
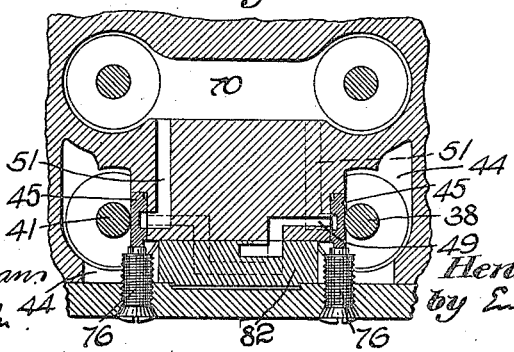

In the drawings: Figure 1 is a front elevation of a channeling machine embodying one form of my invention; Fig. 2 is an end elevation of the channeling machine shown in Fig. 1; Fig. 3 is a sectional elevation taken transversely on the line 3—3 in Fig. 4, partially broken away, showing in detail and on a large scale the arrangement of the valves; Fig. 4 is an enlarged section in plan partially broken away taken on the line 4—4 of Fig. 3; Fig. 5 is an enlarged section taken on line 5—5 in Fig. 3; Fig. 6 is a detail in perspective showing the block for the main controlling valve; Fig. 7 is a similar view showing the main controlling valve; Fig. 8 is a sectional elevation on the line 8—8 in Fig. 4, and in a plane taken through the reversing valves; Fig. 9 is a sectional detail view showing the main controlling valve in a different position from Fig. 8; Fig. 10 is a similar view showing the valve in still a different position; Fig. 11 shows an enlarged view of the reversing slide valve in perspective; Fig. 12 shows a modified construction of controlling valve and valve block; Fig. 13 shows a modified construction omitting the main controlling valve; Fig. 14 shows a second modification omitting the controlling valve; Fig. 15 is a section in elevation showing still a third modification; Fig. 16 is an enlarged section in plan taken on the line 16—16 in Fig. 15; Fig. 17 is a detail showing in elevation the arrangement of controlling levers for the cushioning valves; Fig. 18 is a similar view showing the same in plan; Fig. 19 is a detail sectional plan showing the position of the cushioning valves for the lower cylinder exhaust passages; Fig. 20 is a section on the line 20—20 in Fig. 19; Fig. 21 is a view similar to Fig. 9 showing a modified construction of the controlling valve; and Fig. 22 is a section on the line 22—22 in Fig. 21.

Referring to Figs. 1 and 2, while my invention may be applied to other purposes and other machines, I have there shown the same embodied in a track channeling machine having a main truck or frame 1 provided with the wheels 2, the latter adapted to move upon the rails 3 customarily laid upon the bottom of the quarry.

The truck carries a truck-driving motor or engine 4 and usually a boiler (the latter not shown), the engine crank-shaft 5 being connected through the reversing gearing 6, clutch shaft 12, spur gear 7, worm shaft 8 and worm gears 9 with the truck axles 10, whereby the truck may be driven under its own power. The clutch lever 11 is constructed and connected to clutch the shaft 12 to one or the other of the two oppositely driven bevel gears of the reversing gearing 6 to effect movement of the truck in either direction. Such gearing may be of any suitable or usual construction, and is unnecessary to describe in further detail, the same herein being of the general principle disclosed in U. S. Patent to Ball No. 392,398.

While the channeling units may be carried on the truck in any suitable manner there is here shown supported at the working side of the truck, the supporting plate 13 serving adjustably to carry the upright standard 14. The plate is mounted for a limited angular adjustment away from the vertical plane, being provided at either end with a longitudinal depending supporting member 15, which is fulcrumed in a groove in the truck frame, in which it is held down by means of the bolts 16 and clamps 17. The clamp may be loosened and the plate tipped back for angle cutting through the adjustment of the stay or brace rods 18. The front face of the supporting plate is provided with horizontal T slots 19, to which the standard 14 may be bolted, being adjustable to either end of the truck or any other intermediate position.

Referring now to the channeling units, the latter are two in number, although more may be employed if desired. While other forms of motive devices for reciprocating the channeling tools may be employed, I have herein shown ordinary and usual constructions of pressure fluid engines having their cylinders 20, 21, together with the cross-head guides 22, 23, which act to guide the tool-carrying cross-heads 24, 25, all mounted upon and carried by a vertically adjustable frame 26. The latter is gibbed to slide upon longitudinal finished ways 27 upon the standard, and the cylinder casting has its upper end secured to the lower end of the feed adjusting screw 28, so that the latter may act to advance or retract the frame together with the cylinders, and thereby adjust the gangs 29 and 30 of the channeling tools toward or away from the work.

Any suitable means for feeding the tools in the manner set forth may be employed, but herein I have provided a threaded nut with the beveled gear 31 held against longitudinal movement by the standard 14. The nut and gear are turned by the sprocket wheel 32, the latter being driven through the chain 33 and the engine 4, so that the latter is available to feed the tool toward or from the work, a controlling lever 34 being employed to start, stop or reverse the tool feed.

Power in the form of steam or other pressure fluid may be supplied for the engine, either from a boiler, which may be carried upon the truck, or from any other suitable source, from which it is led to the pressure chest of the engines by connections not shown.

The controlling valves for the two channeling units are so arranged that the latter may be operated together in opposed step or independently of each other, or power in the form of pressure fluid may be supplied to operate the one while being withheld from the other. In order that the two sets of tools may be ordinarily worked together out of unison and preferably in opposed step, I have herein shown the reversing valve of one engine controlled by the reciprocatory movement of the other, so that as one gang moves up the other one will move down, and vice versa.

While the controlling valves may have any desired type or construction, I have herein provided a main pressure actuated valve of the piston type for each cylinder and a separate reversing valve for controlling each piston valve, there being also provided additional main controlling valve means by which the relation between the reversing valves and their pressure actuated piston valves may be altered at will.

The valves (Fig. 1) are disposed in a valve chamber 37 between the two cylinders 20, 21. The right-hand (looking toward the machine, Fig. 1) reversing valve has its stem 38 connected to the lever 39, which latter has one end pivoted to the frame 26 and its opposite end connected by the link 40 to the right-hand cross-head 24. Likewise the stem 41 of the left-hand reversing valve is connected by means of the lever 42 and the link 43 to the left-hand cross-head 25. By this means the downward movement of the right-hand cross-head causes downward movement of the right-hand reversing valve, and likewise the downward movement of the left-hand cross-head causes downward movement of the left-hand reversing valve.

During the normal operation of the machine the main controlling or distributing valve, the handle for which is shown in Fig. 1 at 44ª, is set so that the right-hand reversing valve acts to reverse the left-hand engine, and the left-hand reversing valve acts to reverse the right hand engine, so that a reversal of one engine from a downward to an upward movement takes place at the end of the downward movement of the crosshead of the other, the reversing valves being actuated when the pistons are at or near the center of their strokes.

Referring to Figs. 3–8, the arrangement of valves by which the foregoing operation is accomplished will be clear and it will be necessary to refer in detail to one set of valves only, since the construction and operation of the other set is substantially the same. Live steam or other pressure fluid is admitted to the pressure chamber 44 (Figs. 3 and 5) through which the stem of each reversing valve passes and thence is admitted to each pressure-actuated piston valve chamber under the control of the reversing valves 45, herein of the shell valve form and shown in detail at Fig. 11.

Each reversing valve 45 works between upper and lower abutments 46, 47, upon the reversing valve stem, being preferably though not necessarily engaged by the latter with a certain amount of lost motion, so as to be moved up or down by the crosshead during the up or down movement respectively of the latter in either direction, while engaging its seat upon the valve block 48 (Figs. 6 and 8).

The valve block is provided at each side with valve-controlled passages comprising an upper radial passage 49, a lower radial passage 50 and an intermediate passage 51, the latter (Fig. 4) connected with the exhaust. The valve block is also provided at the top and bottom with a pair of upper and lower radial passages. The two upper passages 52, 53, connect, respectively, with passages 54, 55, in the valve casing leading to the upper ends (Figs. 3 and 8) of the chamber for the main or controlling valves, while the lower radial passages 56, 57 are connected, respectively, with passages 58, 59 leading to the lower ends of said main valve chambers. Centrally arranged within the valve block is the tapered controlling or distributing valve 60 provided with a plurality of transverse passages adapted to register with the radial passages in the valve block and having attached thereto the exterior handle 44ª, by which the distributing valve may be turned to make various connections between the lateral admission and exhaust passages of the valve block and the top and bottom passages leading to the controlling valves.

Referring to Fig. 3 which shows the right-hand pressure-actuated main valve, the latter is provided at opposite ends with spools 61 and 62 working in chambers to which the upper and lower pressure passages 54 and 58 lead, so that when the lower passage is connected with the exhaust and the upper passage with the admission, the valve is caused to descend to the position shown in Fig. 3. When the connections are reversed the valve rises to a reverse position.

The upper admission passage for the right-hand cylinder is represented at 63 in Fig. 3, the lower admission passage for the tool end of the cylinder is represented at 64, the upper exhaust passage at 65 and the lower exhaust passage at 66. The controlling valve is also provided with upper and lower spools 67, 68, which control the upper and lower exhaust passages referred to, and in the depressed position of the valve, as represented in Fig. 3, serve to admit pressure from the pressure port 69 of the main valve to the upper admission passage 63 and connect the lower exhaust passage with the central exhaust space 70 of the main valve, which space is permanently connected with the exhaust of the engine. When the valve is lifted it will be obvious that pressure is admitted from the lower pressure port 71 of the main valve to the lower admission passage 64 and pressure is exhausted from the upper end of the cylinder through the passage 65, this resulting in the subsequent reversal of the piston movement.

The handle 44ª is provided with a spring pressed pin 72 adapted to engage with holes or notches in the face of the valve casing and may be set in any one of a plurality of positions to give various connections to the main valve passages. In Fig. 8 it is represented so placed as to cause the left-hand reversing valve to control the right-hand main valve and to keep the two engines and tool-gangs out of unison.

The plug valve 60 is shown as provided with several transverse passages 73, herein six in number and arranged in three sets or pairs placed in non-conflicting planes but adapted to connect the radial passages of the valve block. In Fig. 8 the position of the plug is such that the downward radial passage 56 is connected with the lateral radial passage 50, and the upper radial passage 52 is connected with the lateral radial passage 49, so that during the downward movement of the reversing valve 45 the pressure is exhausted from beneath the end of the right-hand main valve, and admitted to the top end of the right-hand main valve, thereby to depress the same.

The passages leading to the left-hand main valve are controlled in a similar fashion by the right-hand reversing valve. The reversing valve 45 is provided at each end with a slit 74 which registers with the mouth of the lateral radial passage in the valve block, so that a very quick admission is effected to those passages acting quickly to reverse the main valve soon after the reversing valve starts to move. As is represented in Figs. 3 and 8, the left-hand piston is down and the right-hand piston up, the former having moved its reversing valve down to depress the right-hand main valve so as to reverse the movement of the right-hand piston, which latter has raised its reversing valve sufficiently to lift the left-hand main valve and reverse the movement of the left-hand piston. By this means it will be seen that so long as the plug of the distributing valve remains in the position indicated in Fig. 8, the two engines will be run out of unison, and as shown in the drawings synchronously in opposed step, the movement of one in one direction being dependent upon the movement of the other in the opposite direction.

In order to give frictional resistance to the movement of the reversing valves 45 and permit the lost motion referred to, the valves (Fig. 4) are held laterally against adjacent guiding faces on the block by means of spring-pressed pins 75, carried in the end of the screws 76 threaded into the face of the valve casing. The distributing valve 60 is held to its tapered seat (Fig. 4) by means of a spiral spring 77 in the exhaust casing 70.

By turning the distributing valve handle 44ᵃ to the left, as viewed in Fig. 1, the right-hand engine may be rendered inoperative and the left-hand reversing valve connected to directly and independently control the left-hand engine, which, therefore, works under full power and at full speed. Such a position of the distributing valve is represented in Fig. 9, where it will be seen the upper lateral radial left-hand passage 49 of the valve block is connected to the downward left-hand radial passage 57, and the lower lateral radial left-hand passage 50 is connected to the upper radial left-hand passage 53. This places the left-hand main valve and left-hand cylinder under the control of the left-hand reversing valve. At some time after the piston starts on its down stroke it causes admission of pressure to the top of its main valve and exhausts from the bottom, this acting to admit pressure below the piston and exhaust from above, thus serving to reverse itself. Under these conditions it runs independently of the right-hand piston and at the highest speed obtainable from the supplied pressure.

Turning to the pressure passages controlled by the right-hand reversing valve as shown in Fig. 9, it will be observed that the lower right-hand lateral radial passage 50 of the valve block is closed by the distributing valve, while the upper passage 49 is connected to the lower right-hand radial passage 56. It will also be observed that the upper radial passage 52 is also closed by the distributing valve thereby preventing access of pressure to the top of the right-hand main valve. Under the conditions represented at Fig. 9, the absence of pressure at the top of the right-hand main valve causes the latter to remain uplifted except as it may tend to gravitate downwardly, thereby permanently connecting the upper exhaust passage 65 of the cylinder with the exhaust space 70, tending to lift the right-hand piston up and the right-hand tool gang out of the cut, so long as the conditions represented in Fig. 9 last.

It will be observed that each valve stem 38 and 41 is provided with upper and lower spools 78 and 79, which act as cut off valves and alternately open and close the pressure ports 69 and 71 of the main valves, pressure being admitted to the port 69 only when the cut off valve is up, and to the port 71 only when the cut off valve is down, (see Fig. 8). The cut off spools therefore cut off pressure to the cylinder before the main valve acts and thereby serve to give a sharp cut off and more economical consumption of the steam or other pressure fluid employed. Under the conditions described with reference to Fig. 9, while pressure is normally cut off from the lower pressure port 71 of the right-hand main valve, the same is instantly admitted thereto and therefore to the lower admission passage 64 if the right-hand piston drops below a certain point.

With the distributing valve in the position shown in Fig. 9 the right-hand piston at first lifts to the top of its cylinder, and the elevation of the cut off valve spool 79 immediately cuts off admission from the bottom of the cylinder. Condensation or leakage will gradually permit the weight of the tool gang to draw the piston down. As soon, however, as the spool 79 of the reversing valve opens the port 71 to the pressure space 44 a small amount of steam will instantly be admitted below the piston and cause the latter again to lift. This condition permits the left-hand piston to be run at full speed while the other comes well up to the top of its cylinder and moves slightly and slowly up and down enough to free the cylinder of water from the line of piping or from condensation. By this means all effective power is withheld from the right-hand cylinder, resulting in a great economy of steam.

If the main valve becomes worn so that it descends by gravity before the piston descends, substantially the same result follows since the main valve is raised by pressure as soon as the piston and reversing valve descends far enough.

If the distributing valve handle is thrown to the right from the position shown in Fig. 8 it assumes a position represented in Fig. 10, where power is withheld from the left-hand engine and the latter rendered inoperative, while the right-hand engine continues to run under full power. The connections of the various ports and passages being substantially the same as in Fig. 9, though in reverse relation with reference to the two cylinders, no further explanation will be necessary with reference to Fig. 10, it being understood that the same action takes place with reference to the right-hand cylinder and the left hand cylinder as has been described with reference to the left-hand cylinder and right-hand cylinder, respectively, in connection with Fig. 9.

If the distributing valve is turned either farther to the right of the position shown in Fig. 10, or farther to the left of the position shown in Fig. 9, it will assume a position wherein it serves to connect the controlled pressure passages of the left-hand reversing valve with the left-hand main valve, and the controlled pressure passages of the right-hand reversing valve with the right-hand main valve. The two engines are then run independently of each other, each under the full head of pressure. Such position of the distributing valve is not illustrated, but the relation of the passages will be readily comprehended from Fig. 14 where I have shown precisely the same passage connections but with the passages permanently formed in the walls of the casing and without the employment of an adjustable distributing valve. In the construction of Fig. 14 the two engines are run independently and constantly, while pressure is supplied thereto except as one or the other may be rendered inoperative for cutting purposes by use of the cushioning valve, to be described.

In Fig. 13 I have shown a modified construction wherein no distributing valve is employed, the pressure passages being permanently formed within the walls of the valve casing and so arranged that the same condition permanently exists as is effected by moving the distributing valve to the position shown in Fig. 8, that is to say, the engines are permanently connected to work in opposed step.

In Fig. 12 I have shown a modified construction of valve block 80 and distributing valve 81, passages therefor being so disposed that in the position shown in Fig. 12 the pressure passages leading to the upper ends of the two main valves are controlled by one reversing valve, while the pressure passages leading to the lower ends of the said main valves are controlled by the other reversing valve. The effect of this is to admit pressure to the top of one main valve and to simultaneously exhaust the same from the top of the other by movement of one reversing valve, while pressure is simultaneously exhausted from the bottom of the first main valve and admitted to the bottom of the second main valve by a simultaneous reverse movement of the other reversing valve. This secures in another way the synchronous cutting action of the two engines out of unison and in alternation. The distributing valve in Fig. 12 may also be moved to a position (not shown) to provide for the independent operation of the two engines under conditions resembling those shown in Fig. 14.

In Figs. 15 and 16 I have shown a modified construction of the form represented in Fig. 13, where the engines are permanently connected to run in opposed step, the principal difference being that the connections between the pressure passages leading to the ends of the main valves and the pressure passages controlled by the reverse valve are formed in a face plate 82 fastened to the walls of the valve chamber. The use of such face plate imposes an out-of-step operation upon the engines, so long as it is employed. If, however, it is desired to operate the engines singly or independently, the face plate 82 may be removed and another one substituted therefor having the necessary connecting passages to provide the connections shown in Fig. 14.

Obviously the particular construction of distributing valve is a matter of minor importance and this invention comprehends any suitable device for accomplishing this purpose. The valve, if desired, may be in the form of a slide valve or in the form of a plate, like the face plate 82, but capable of rotative movement, or any other suitable valve construction may be used.

From the construction described, it will be evident that a channeling machine provided with channeling units equipped as disclosed, may be traversed with both units in simultaneous operation, thereby obtaining greatly increased working output as compared with channeling machines of the usual construction. When the machine reaches the right-hand end of the cut the distributing valve may be turned to throw the left-hand engine out of operation and the machine reversed to cause it to travel back a distance equal to the distance between the centers of the tool gangs, when it is again reversed and caused to travel again to the extreme end of the cut. The feed can then again be reversed and the distributing valve handle moved to start both engines in operation, which condition may hold until the machine reaches the left-hand end of the cut on its return travel, whereupon the right-hand cylinder and gang may be rendered inoperative and the machine worked with reference to the left-hand end of the cut, as has been described with reference to the right-hand end thereof.

Means are provided for cushioning or throttling the exhaust in the lower end of either cylinder, so that the force of the blow struck by the tool gang may be varied or the blow caused to fall short of the work. This is ordinarily useful in regulating the blow of the tool, although, if desired, the exhaust cushioning device may be used to render one or the other, or both tool gangs temporarily inoperative, such use, however, being not so economical or convenient as the employment of the distributing valve described.

In the drawings I have disclosed means for operating the exhaust throttle valve for each cylinder either separately or together. Referring to Figs. 17 and 19, and particularly to the cross-sectional plan of the cylinders shown in Fig. 19, the exhaust passage 66 will be seen to branch just before entering the cylinder and in the two branches there is placed transversely a throttle valve 83 comprising a cylindrical member partly cut away at the point where it traverses the exhaust passage and so shaped that by turning the same the available cross-sectional area of the exhaust passages may be varied, and more or less of the exhaust pressure fluid thereby trapped in the bottom of the cylinder to check the force of the downward piston blow.

The valves 83 pass to the outside and back of the cylinder where they are each connected to a slotted arm 84. The slot in the arm 84 for the cylinder 20 is engaged by a pin 85 carried by the depending finger 86 on the inner one of a pair of horizontal slide rods, the inside rod 87 having an upwardly and outwardly turned handle 88 by which it may be moved and the exhaust for the cylinder 20 thereby throttled. The exhaust throttle valve for the cylinder 20 is likewise controlled by the outwardly inclined horizontal handle 89 secured to the outer one 90 of the two slide rods, the latter carrying a depending finger 91 provided with pin 92 engaging the arm 84 of the throttle valve.

Spring clips 93 offer frictional resistance to the accidental displacement of the slide rods and the controlling handles 88, 89, of the latter are so arranged that they may be grasped together and the throttle valves 45 turned simultaneously or one or the other grasped or moved to the exclusion of the remaining one. The opposite ends (not shown) of the controlling rods are preferably provided with duplicate handles 88 and 89, so that the piston blow may be cushioned by an attendant standing at either side of the standard.

In order to regulate somewhat the movement of the ineffective piston when effective power is withheld therefrom, as by the movement of the distributing valve in one direction or the other, and also to cushion the up movement of the main valve and the piston, it may sometimes be advisable to admit a throttled or regulated amount of pressure to the top of the main valve instead of cutting off that side of the main valve entirely from the pressure, as represented in Figs. 9 and 10. This may be done in any suitable way, but in Figs. 21 and 22 there is shown by way of illustration a distributing valve similar to that shown in Figs. 8 to 10 but having an extra pair of passages 94 and 95 provided with throttling screws 96 and 97, which may be adjusted from the outside by taking off the valve handle 44ᵃ. These passages are brought into service only when the valve handle is turned to the right or to the left for throwing out the left or right hand cylinder respectively. When thrown to the left or to the position corresponding to that in Fig. 9, pressure is admitted to the bottom of the main valve through the lower radial passage 56 as before, and pressure is also admitted to the top of the controlling valve through the upper radial passage 52 to an extend which may be delicately regulated by the throttling screw 96. Under these conditions a small amount of pressure is repeatedly admitted to the top of the main valve and to the top of the piston so that these parts are cushioned on their upward movement. Such device also serves to regulate the rapidity and force of the piston movement when it is withheld from effective action as described.

As the main valves become worn, pressure tends to leak past the spools 61 or 62 from the pressure ports 69 or 71 respectively and passing to the ends of the spool interfere with the best operation of the valves. There are provided annular grooves 98 and 99 covered by the valve spools 61 and 62, which grooves connect respectively with passages 100 to 101 leading to the exhaust (see Fig. 3). This permits the transference of pressure fluid which leaks past the inner edges of the spool to the exhaust and thereby prevents its interference with the normal working of the valve.

While preferably is shown the two channeling units normally operated in opposed step, so that they tend to balance each other, it is not essential to my invention that they be operated exactly in this relation, although it is desirable that they be in some measure out of unison, in order that the blow of one unit may not take place at the same time with the blow of the other unit, and thereby require the machine to withstand a double shock.

Where channeling units are employed using an engine construction similar to that described, the particular point in the stroke at which reversal takes place is immaterial so far as my invention is concerned, provided the pistons are reversed at or near the center of their strokes, it being more properly a matter of engine design or adjustment to suit particular conditions. Obviously, in the construction shown the point in the cycle of movement at which reversal takes place may be varied by eliminating or varying the amount of lost motion which takes place between the reversing valve and its stem or by varying the length of the slots 74 in the reversing valve.

While I have herein shown and described one form of my invention, it is to be understood that the same is not limited to the details of construction or to the form or relative arrangement of parts, but that extensive modifications may be made in constructional details, as well as the application herein made of the invention, without departing from the spirit thereof.

Claims:

1. A channeling machine comprising, in combination, a pair of tool-reciprocating devices with separate cutting tools; a support on which said devices are mounted side by side with their cutting tools arranged to work one in advance of the other in the channel groove; means for causing motive energy to be supplied to said devices to operate the same simultaneously; and means instantly available at the will of the operator to cause motive energy to be withheld from either at will while continuing to operate the other.

2. A channeling machine having a pair of tool-reciprocating devices; a support on which said devices are mounted side by side with their cutting tools arranged to work one in advance of the other in the channel groove; means for causing their operation in timed relation; and means instantly available at the will of the operator to cause motive energy to be supplied to both or withheld from either device while continuing to operate the other, thereby to give the same a reciprocating movement either independently of each other or in timed relation with each other.

3. A channeling machine having a pair of tool-reciprocating devices; means providing for their operation out of unison; and means instantly available at the will of the operator to cause motive energy to be supplied to both or withheld from either of said devices for giving the same a reciprocatory movement out of unison with each other or giving either a reciprocatory movement independently of the other.

4. A channeling machine having a wheeled truck, a pair of separate tool reciprocating channeling devices mounted at the side thereof, means for driving said truck, means for simultaneously supplying power to cause simultaneous reciprocation of said tool reciprocating devices for the cutting of the main portion of the channeling groove, means for reversing the movement of the truck at the end of the channeling groove, and means for selectively withholding power from either of said tool reciprocating devices at the will of the operator, while permitting effective operation of the other during the reverse movement of the truck.

5. A channeling machine having a pair of tool-operating motors each having a reciprocating member and a controlling device adapted to be actuated by movement of such member; motive energy distributing connections controlled by said controlling device; and means for changing the relative arrangement of said motive energy distributing connections thereby to change the control effected by said devices upon said motors.

6. A channeling machine having a pair of tool reciprocating devices, means for applying power simultaneously to operate the same, means for withholding effective cutting power from one of said devices alone, and means for causing restricted movement of the one from which effective cutting power is withheld.

7. A channeling machine having a plurality of channeling units each provided with its cutting tool or tools; means for causing the simultaneous operation of said units; means for causing one of said units to operate independently while withholding effective power from the other; and means for causing the cutting tools of the latter to be raised out of the cut during the operation of the first.

8. A channeling machine having a plurality of motive power operated channeling units provided each with its cutting tool or tools; means for applying motive power to operate said units simultaneously; and means for applying the motive power, when desired, to operate one of said units only and to raise the cutting tools of the remaining one out of the cut.

9. A channeling machine having a plurality of motive power operated channeling units provided each with its cutting tools; means for applying motive power to operate said units in an out-of-step relation; and means also, when desired, for applying motive power to cut out of effective operation one of said units while continuing the operation of the other, and to raise the tool of the first-mentioned unit out of the cut.

10. A channeling machine having the truck 1; the pair of channeling units 20 and 21 supported thereon; means including the devices 45 for maintaining the units in out-of-step relation; and means including the controlling device 60 for cutting out of operation either unit at will.

11. A channeling machine having a pair of tool reciprocating devices with separate cutting tools, means to cause motive energy to be supplied to simultaneously operate the same, and a single manually operable means for withholding effective motive energy from either while operating the other.

12. A channeling machine having a pair of tool reciprocating devices with separate cutting tools; means to cause motive energy to be supplied to operate the same simultaneously; and means having a single manually operable member for causing effective motive power to be withheld from either while operating the other.

13. A channeling machine having a pair of relatively timed tool-reciprocating devices at the side thereof; means instantly available at the will of the operator for causing motive energy to be supplied to both or withheld from either of said devices; and means for causing their movement independently of each other.

14. A channeling machine having a pair of tool-reciprocating devices at the side thereof; means instantly available at the will of the operator for causing motive energy to be supplied to both or withheld from either of said devices; and means for causing their simultaneous movement out of unison with each other.

15. A channeling machine having a pair of tool-actuating motors; distinct independent controlling devices for said motors; and means under the control of the operator for connecting the controlling devices to the motive energy supply to cause the motors to move their tools either in opposed step or either motor independently of the other.

16. A channeling machine having a pair of tool-actuating motors each having a reciprocatory element; a distinct independent controlling device for each motor connected to be operated by movement of said reciprocating element; and means for changing the motor supply connections to said controlling devices thereby to change the control effected by said devices upon said motors.

17. A channeling machine having a pair of tool reciprocating devices, means for applying power simultaneously to operate the same, means for withholding effective cutting power from either of said devices alone at will, while still permitting its movement, and means for varying the action of the one from which effective cutting power is withheld.

18. A channeling machine having a plurality of channeling units provided each with its cutting tool or tools, means for operating said units simultaneously, means for operating either of said units at will while withholding effective power from the other, and means for raising the cutting tools of the latter out of the cut during the independent operation of the first.

19. A channeling machine having a wheeled truck; a pair of tool-actuating members at the side thereof; controlling devices for said members; and manually changeable conduit means for connecting said controlling devices to drive said members either independently of each other or in synchronism.

20. A channeling machine having a wheeled truck; a pair of tool-actuating members at the side thereof; controlling devices therefor; and manually changeable conduit means for connecting said controlling devices to cause said members to operate either in opposed step or independently of each other.

21. A channeling machine having a wheeled truck; a pair of tool-actuating members at the side thereof; controlling devices therefor; and adjustable conduit means for connecting said devices to give reciprocatory movement of said members in opposed step or withholding power from one while still operating the other.

22. A channeling machine having a wheeled truck; a pair of tool-actuating members mounted thereon and each having a controlling device connected to be actuated by the tool-actuating movement thereof; and relatively movable conduit means for changing the control exercised by said controlling devices over said tool-actuating members.

23. A channeling machine having a wheeled truck; a pair of tool reciprocating devices with separate cutting tools at the side thereof; means for causing motive energy to be supplied to simultaneously operate the same; and a single means for withholding effective supply of energy from either at will while operating the other.

24. A channeling machine having a pair of tool-operating devices at the side thereof; a single means at will to cause motive energy to be supplied to both or withheld from either device thereby to give the same a reciprocating movement either independently of each other or simultaneously; and means to synchronize their movement when operated simultaneously.

25. A channeling machine having in combination, a pair of tool-connected motors; controlling devices therefor; and regulating means having provision in one position to connect said controlling devices to cause said motors to operate in opposed step and having provision in another position to cause said motors to operate independently of each other.

26. A channeling machine having in combination, a pair of tool-connected motors; controlling devices for said motors; and regulating means having provision in one position for connecting said controlling devices to drive said motors independently of each other and having provision in another position for connecting said controlling devices to drive said motors in definitely timed relation with each other.

27. A channeling machine having in combination, a pair of tool-connected motors; controlling devices therefor; and regulating means having provision in one position for connecting said devices to cause said motors to give reciprocatory tool movement in opposed step and having provision in another position for withholding power from one while still operating the other.

28. A channeling machine comprising, in combination, a pair of tools, a pair of tool-reciprocating devices; means instantly available at the will of the operator for causing motive power to be supplied to both or withheld from either of said devices; and controlling means having one position in which said devices are caused to operate independently of each other and another position in which said devices are caused to operate in definitely timed relation with each other.

29. A channeling machine having, in combination, a pair of tools; a pair of tool-actuating motors; distinct controlling devices for said motors; controlling means under the control of the operator having positions of adjustment for connecting said controlling devices to the motive energy supply to drive either of said motors at the will of the operator independently of the other; and means which in another position of adjustment of said controlling means causes the motive energy to drive said motors in definitely timed relation with each other.

In testimony whereof, I have signed my name to this specification, in the presence of two subscribing witnesses.

HENRY H. MERCER.

Witnesses:
ROBERT J. MERRILL,
THOMAS B. BOOTH.

Copies of this patent may be obtained for five cents each, by addressing the "Commissioner of Patents, Washington, D. C."